(12) United States Patent
Lizak

(10) Patent No.: US 8,641,137 B2
(45) Date of Patent: Feb. 4, 2014

(54) VEHICLE HEADLINER ASSEMBLY

(75) Inventor: Daniel G. Lizak, Howell, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 13/459,359

(22) Filed: Apr. 30, 2012

(65) Prior Publication Data

US 2013/0285419 A1 Oct. 31, 2013

(51) Int. Cl.
B60R 13/02 (2006.01)

(52) U.S. Cl.
USPC ...................................... 296/214; 296/216.07

(58) Field of Classification Search
USPC ........................................................ 296/214
See application file for complete search history.

(56) References Cited

U.S. PATENT DOCUMENTS

| 5,242,204 | A | 9/1993 | Kitterman et al. |
| 5,269,060 | A | 12/1993 | Dowd et al. |
| 5,636,891 | A | 6/1997 | Van Order et al. |
| 5,788,205 | A | 8/1998 | Hansen |
| 6,042,296 | A | 3/2000 | Wittig et al. |
| 6,491,333 | B2 | 12/2002 | Ichikawa et al. |
| 6,606,766 | B2 | 8/2003 | Ko |
| 6,664,470 | B2 | 12/2003 | Nagamoto |
| 7,052,068 | B2 * | 5/2006 | Sturt et al. ................... 296/37.7 |
| 7,441,996 | B2 | 10/2008 | Odulio et al. |
| 7,798,552 | B2 | 9/2010 | Takai |
| 8,042,863 | B2 * | 10/2011 | Nydam ......................... 296/210 |

FOREIGN PATENT DOCUMENTS

WO   WO 99/21729   5/1999

OTHER PUBLICATIONS

U.S. Appl. No. 13/188,140, filed Jul. 21, 2011, Inoue et al.

* cited by examiner

Primary Examiner — Joseph Pape
Assistant Examiner — Dana Ivey
(74) Attorney, Agent, or Firm — Global IP Counselors, LLP

(57) ABSTRACT

A vehicle headliner assembly includes a roof bow, a headliner, an alignment member and a fastener. The roof bow includes an attachment portion defining a first slot. The headliner includes a mounting portion defining a first aperture aligned with the first slot. The alignment member is nonmovably attached to the roof bow at the first slot and defines an alignment hole that coincides with the first slot. The fastener includes an attachment projection that extends through the first aperture, through the alignment hole of the alignment member and through the first slot. The attachment projection has a retaining surface that contacts a surface of the roof bow adjacent to the first slot and faces away from the headliner such that the fastener retains the headliner to the roof bow.

20 Claims, 11 Drawing Sheets

VEHICLE HEADLINER ASSEMBLY

BACKGROUND

1. Field of the Invention

The present invention generally relates to a vehicle headliner assembly. More specifically, the present invention relates to headliner assembly that includes an alignment member that facilitates alignment of apertures of a headliner with slots in a roof assembly.

2. Background Information

Passenger compartments of vehicles typically include a headliner that is attached to structural members of the vehicle adjacent to the roof of the vehicle. In large vehicles such as buses or custom vans, a correspondingly large headliner is employed. Due to the size of such headliners, installation can be difficult and cumbersome.

SUMMARY

One object of the invention is to provide a headliner assembly with a structure that facilitates simplified installation.

Another object of the invention is to provide a headliner and roof structure with a convenient way to align holes of the headliner with slots in the roof structure.

In view of the state of the known technology, one aspect of the invention has a vehicle headliner assembly that includes a roof bow, a headliner, an alignment member and a fastener. The roof bow includes an attachment portion defining a first slot. The headliner includes a mounting portion defining a first aperture aligned with the first slot. The alignment member is non-movably attached to the roof bow at the first slot and defines an alignment hole that coincides with the first slot. The fastener includes an attachment projection that extends through the first aperture, through the alignment hole of the alignment member and through the first slot. The attachment projection has a retaining surface that contacts a surface of the roof bow adjacent to the first slot and faces away from the headliner such that the fastener retains the headliner to the roof bow.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
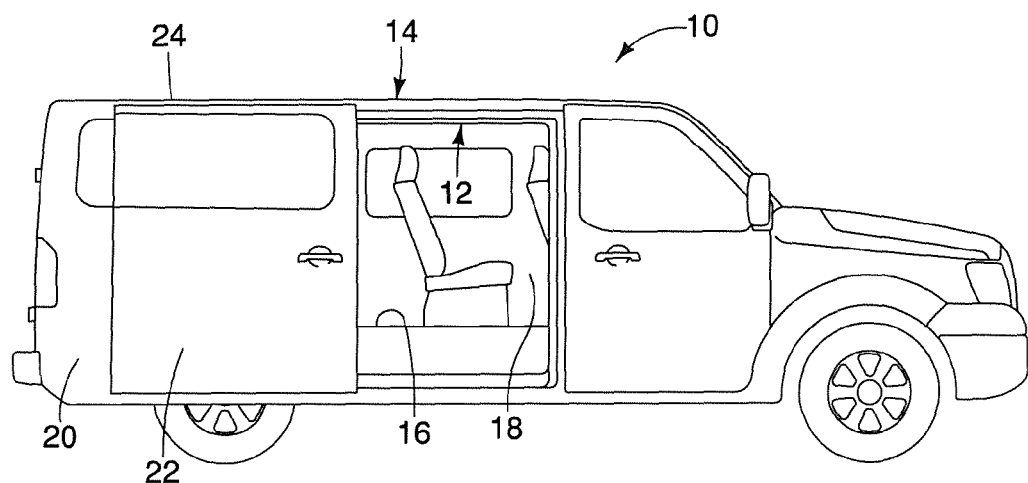
FIG. 1 is a side view of a vehicle that includes a headliner assembly in accordance with a first embodiment.
Figure 2:
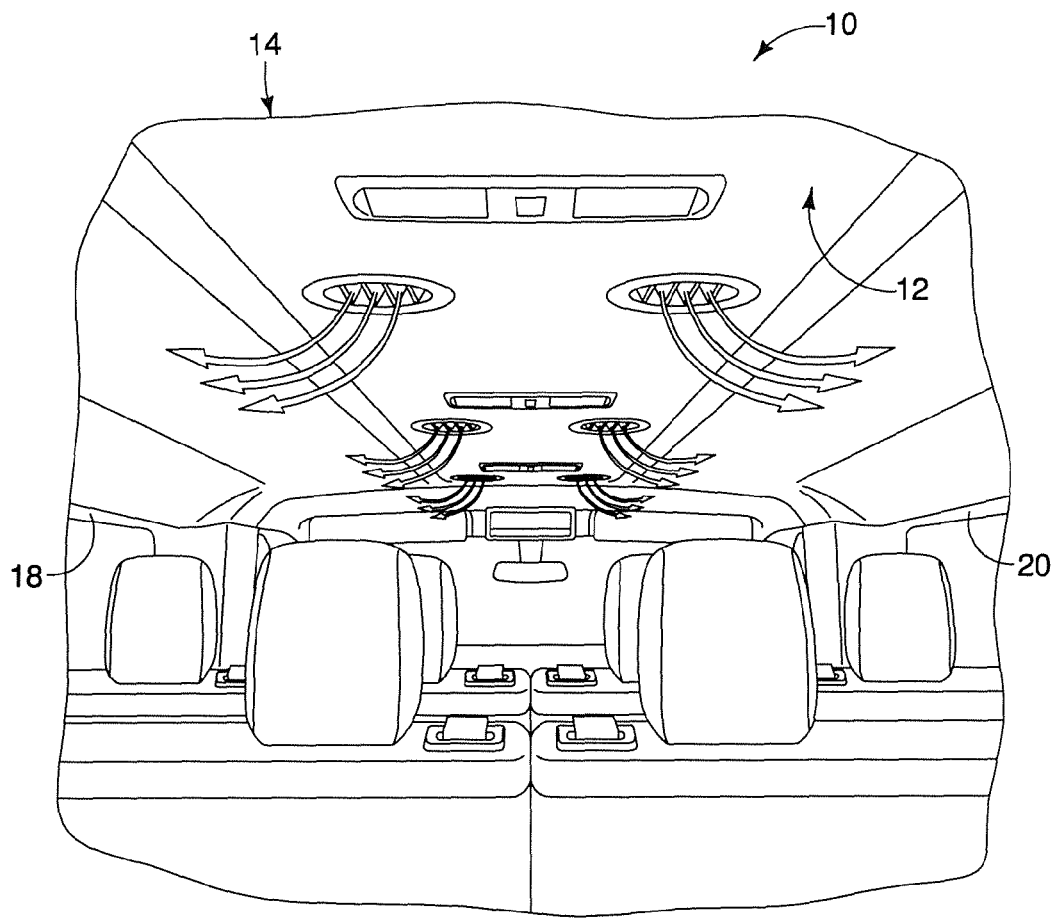
FIG. 2 is an elevation of an interior of the vehicle showing the headliner of the headliner assembly in accordance with the first embodiment.

Referring initially to FIGS. 1 and 2, a vehicle 10 including a headliner assembly 12 is illustrated in accordance with a first embodiment.

The vehicle 10 includes, among other things, a body structure 14 with a floor 16, side walls 18 and 20, the side wall 20 mating with a sliding door 22, a roof panel 24, a plurality of roof bows 26 (shown in FIG. 3) and a passenger compartment 28 defined within the body structure 14. The headliner assembly 12 is located within the passenger compartment 26 immediately under the roof panel 16.

Many of the various elements of the body structure 14 are conventional features of the vehicle 10. Therefore, only those features related to the headliner assembly 12 are described hereinbelow for the sake of brevity.

Figure 3:
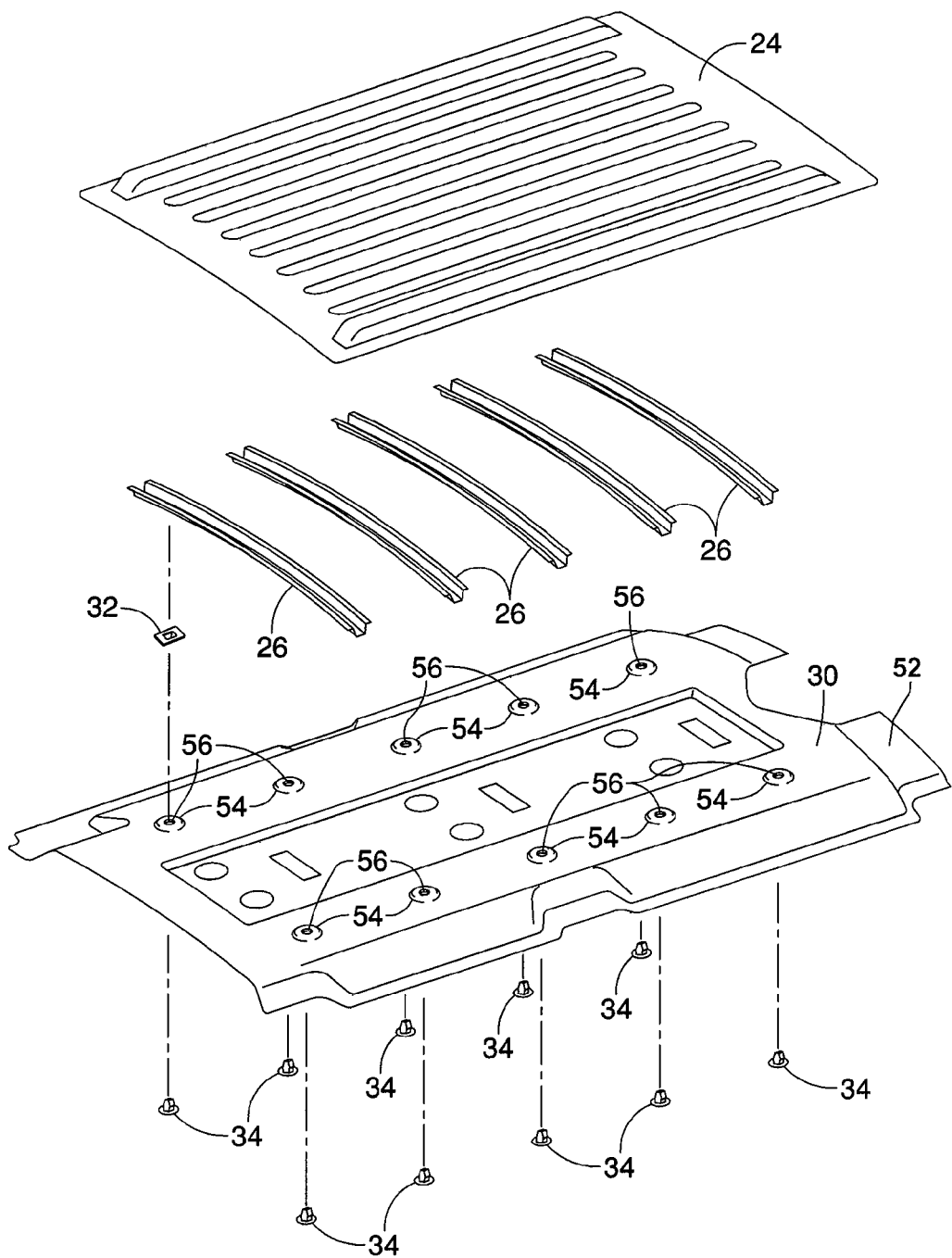
FIG. 3 is an exploded perspective view of a roof panel of the vehicle and the headliner assembly, showing a plurality of roof bows, the headliner, an alignment member and a plurality of fasteners in accordance with the first embodiment.

As shown in FIG. 3, the headliner assembly 12 basically includes the roof bows 26, a headliner 30, an alignment member 32 and a plurality of fasteners 34. Although the roof panel 24 is shown in FIG. 3, the roof panel 24 is not necessarily part of the headliner assembly 12.

Figure 4:
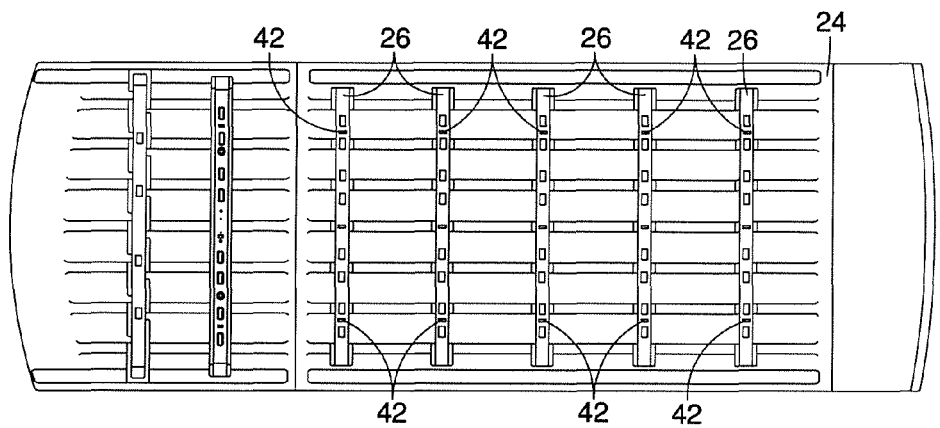
FIG. 4 is a plan view of the roof panel and the roof bows of the vehicle in accordance with the first embodiment.
Figure 5:
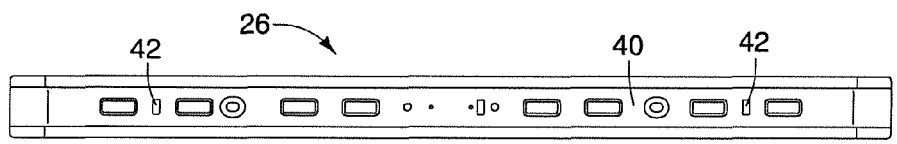
FIG. 5 is a plan view of one of the roof bows, showing a lower surface of the roof bow with several of the slots of the first prescribed pattern in accordance with the first embodiment.
Figure 6:
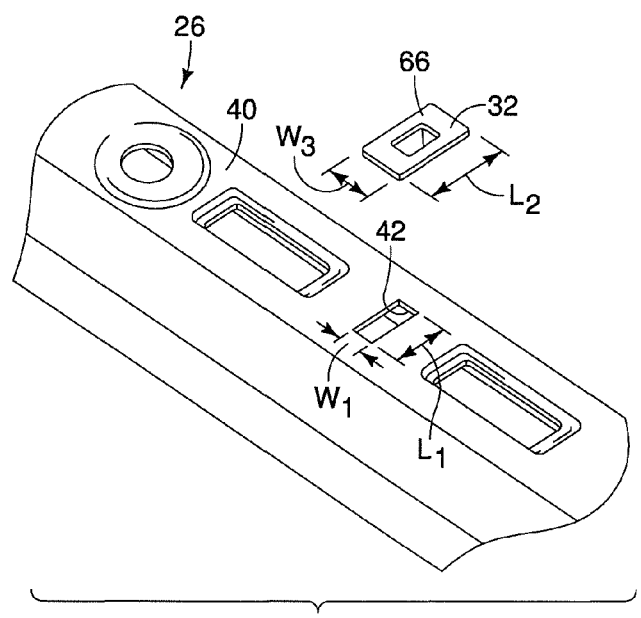
FIG. 6 is an exploded perspective view of the roof bow depicted in FIG. 5, showing one of the slots and the alignment member to be installed in the slot in accordance with the first embodiment.

The roof bows 26 are made of a rigid material, such as metal, but could alternatively be made of a composite material. The roof bows 26 are rigidly fixed to the upper ends of the side walls 18 and 20, in a conventional manner, such as welding. The roof bows 26 extend in a lateral direction relative to the vehicle 10, from the side wall 18 to the side wall 20. The roof bows 26 are arranged parallel to one another and support the roof panel 24, as indicated in FIGS. 3 and 4. Further, the roof panel 24 is welded to upper flange surfaces of the roof bows 26 in a conventional manner. Each of the roof bows 26 has a lower surface that defines an attachment portion 40, as shown in FIGS. 4, 5 and 6. The attachment portion 40 further defines a plurality of slots 42.

Figure 16:
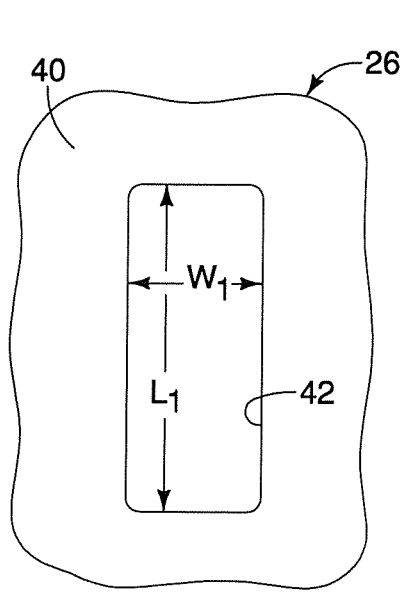
FIG. 16 is a plan view of a portion of one of the roof bows showing details of one of the slots in accordance with the first embodiment.

As shown in FIGS. 5, 6, 7 and 16 each of the slots 42 has an overall rectangular shape. As indicated in FIG. 16, each of the slots 42 defines an overall length $L_1$ and an overall width $W_1$. In the depicted embodiment, the overall length $L_1$ is at least twice the size of the overall width $W_1$.

Figure 13:
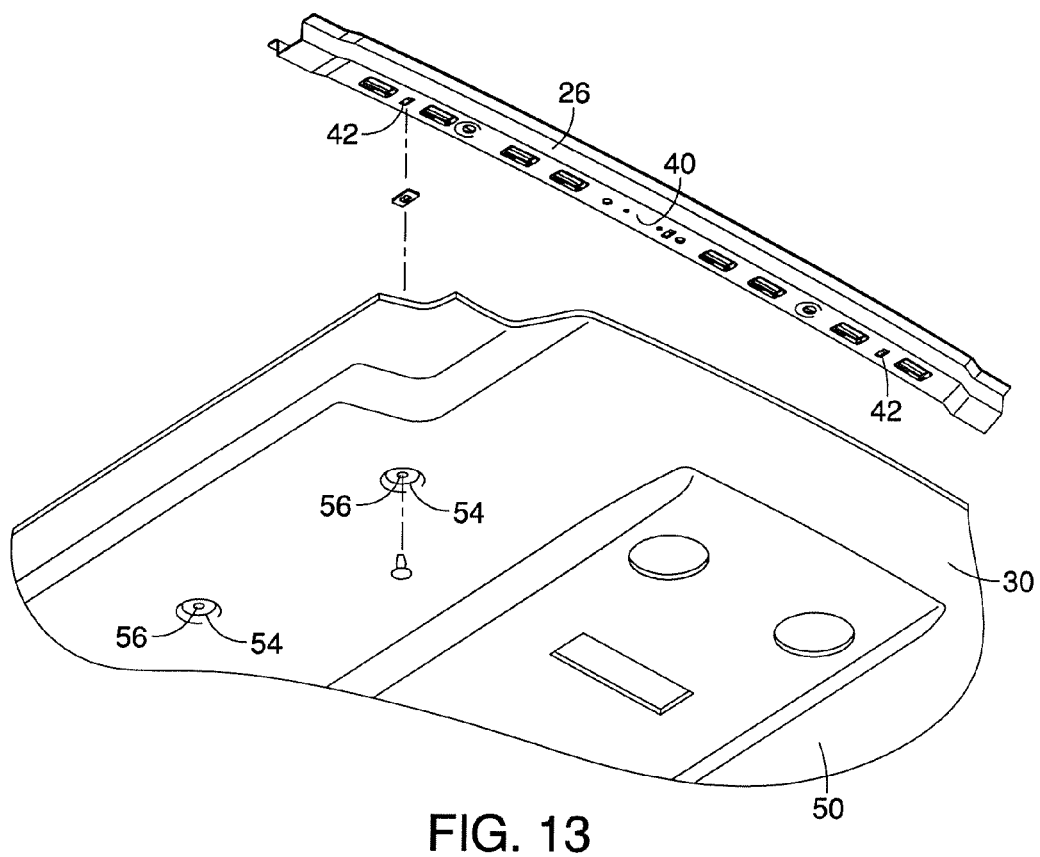
FIG. 13 is a perspective view of the headliner assembly showing one of the roof bows, the alignment member, a portion of the headliner and one of the fasteners in accordance with the first embodiment.

As indicated in FIG. 4, each roof bow 26 includes at least two slots 42. In FIGS. 4 and 13, three slots 42 are depicted in each of the roof bow 26; however as described further below, only two slots 42 are necessary in each roof bow 26 for the depicted embodiment. The number of slots 42 can be varied. For example, in alternate embodiments, there can be three, four or five slots 42 in each roof bow 26, depending upon the design of the vehicle and the design and shape of the headliner.

The slots 42 in the roof bow 26 depicted in FIG. 5 are spaced apart from one another by prescribed distances such that the slots 42 in each roof bow 26 define a first prescribed pattern. The first prescribed pattern is initially defined by the positioning relationship between the two laterally outwardly positioned ones of the slots 42 in the roof bow 26. In FIGS. 3 and 4, there are five of the roof bows 26 depicted. Each of the roof bows 26 includes similarly positioned pairs of the slots 42, spaced apart from one another in a specific relationship or pattern. Hence the first prescribed pattern can also be defined relative to the spacing between each of the roof bows 26 and the relationship between all of the slots 42 in the five depicted roof bows 26.

As shown in FIG. 4, for the depicted embodiment, the first prescribed pattern includes at least two of the slots 42 in each of the roof bows 26, and at least five of the roof bows 26 arranged in parallel to each other with the slots 42. Consequently there are ten (10) of the slots 42 aligned with respect to one another defining an overall rectangular pattern, with five rows of slots 42 and at least two of the slots 42 in each row. In the depicted embodiment, the first prescribed pattern is rectangularly shaped, as defined by these ten (10) slots 42.

It should be understood from the description herein and the drawings, that the first prescribed pattern can have any of a variety of shapes an orientations, depending upon the vehicle design and the overall requirements of the attachment of a headliner to the roof bows 26. Hence, the first prescribed pattern is not limited to the pattern shown in FIGS. 4 and 5.

As shown in FIG. 3, the headliner 30 has an overall rectangular shape, with various cutouts to accommodate features within the vehicle 10. The overall shape and contours of the headliner 30 are a function of the shape of the vehicle 10, the shape of the roof panel 24 and the roof bows 26, and are not intended to limit the possible shape of the headliner 30. In other words, the headliner 30 can have any of a variety of shapes and contours, and is therefore not limited to the depiction in FIG. 3.

The headliner 30 includes a finished surface 50 (shown in FIG. 13) and a mounting surface 52 shown in FIG. 3. The mounting surface 52 is concealed with the headliner 52 installed within the vehicle 10, with the finished surface 50 being exposed. The headliner 30 can be manufactured in any of a variety of ways and can be a single layered material or a multilayered material. For example, the headliner 30 can include a semi-rigid backing material of plastic, polymers and/or fibrous material, with a layer of decorative material adhered thereto, with the decorative material defining the finished surface 50. The decorative material can include textiles, wood veneer, plastic, polymer materials, leather and/or leather-like materials. Alternatively, the headliner 30 can be a single, unitary, monolithic element formed by, for example, a molding process.

The mounting surface 52 of the headliner 30 defines a plurality of raised areas 54 that appear on the finished surface 52 (FIG. 13) as concaved areas or recesses. Each of the raised areas includes an aperture 56, such that the headliner 30 includes a plurality of the apertures 56. In the depicted embodiment shown in FIG. 3, there are ten (10) of the apertures 56 arranged in an overall rectangular shape, with five rows of two apertures 56 per row, thereby defining a second prescribed pattern. The second prescribed pattern defined by the apertures 56 aligns with first prescribed pattern defined by the slots 42 with the headliner 30 installed to the roof bows 26, as further described below.

Figure 14:
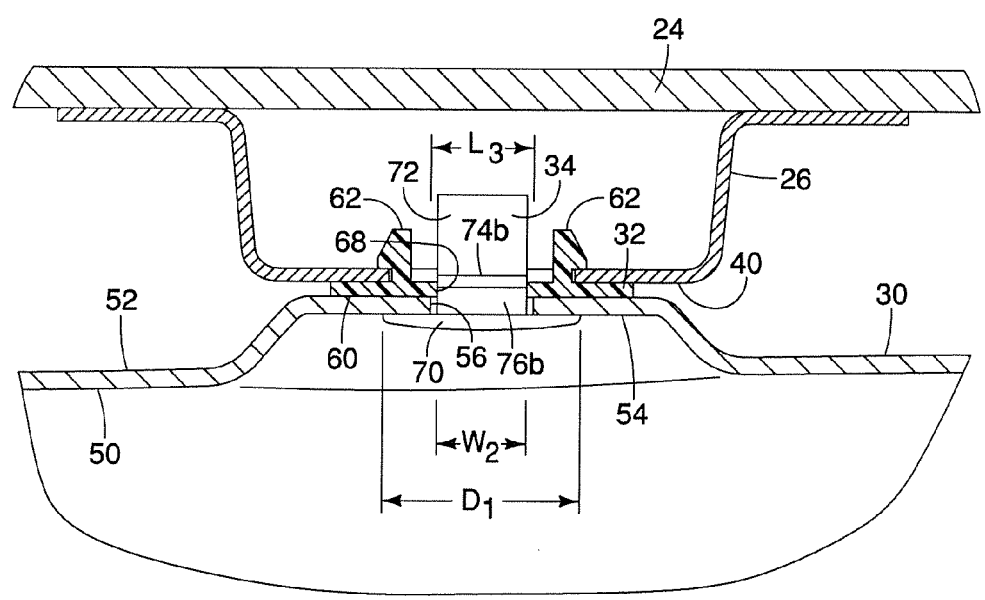
FIG. 14 is a cross-sectional view of a portion of the headliner assembly showing a portion of the roof, a portion of the one of the roof bows, the alignment member, a portion of the headliner and one of the fasteners in accordance with the first embodiment.
Figure 15:
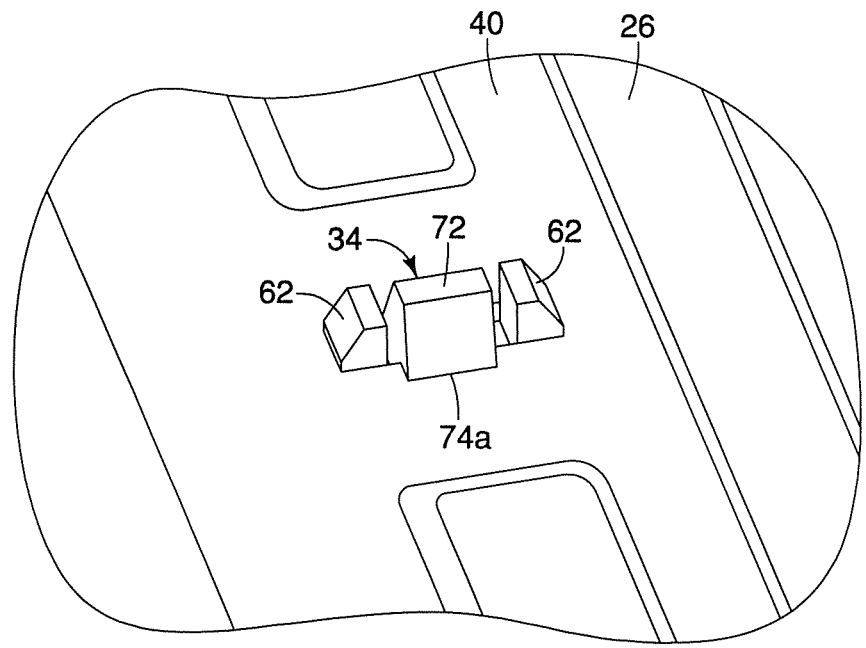
FIG. 15 is a perspective view of one of the roof bows, showing the upper surface of the roof bow with the snap fitting projections of the alignment member and an attachment projection of the fastener extending through the slot of the roof bow in accordance with the first embodiment.

As shown in FIG. 14, each of the apertures 56 defines a diameter or width $W_2$. In the depicted embodiment, the diameter or width $W_2$ of the apertures 56 is approximately equal to the overall width $W_1$ of each of the plurality of slots 42. However, the diameter or width $W_2$ of the apertures 56 can be dimensioned according to need and can be smaller than the overall width $W_1$ of each of the plurality of slots 42.

In the depicted embodiment, there is a single alignment member 32. It should be understood from the drawings and description herein that in alternative embodiments, several alignment members 32 can be included in the headliner assembly 12. However, in the depicted embodiment, only one alignment member 32 is needed, as indicated in FIG. 3.

Figure 7:
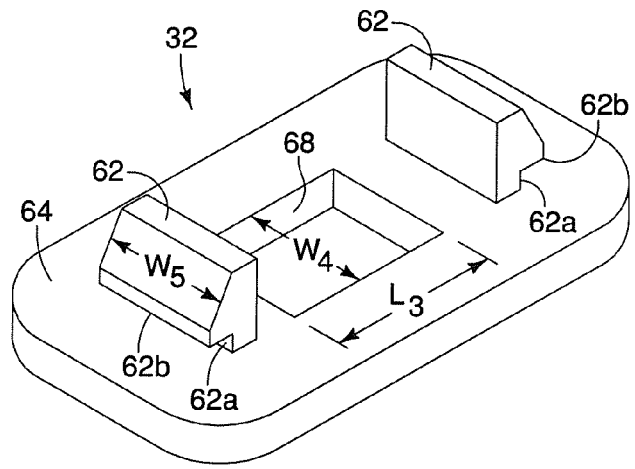
FIG. 7 is a perspective view of the alignment member showing a roof bow facing surface of a base portion of the alignment member, a pair of snap fitting projections and an alignment hole of the alignment member in accordance with the first embodiment.
Figure 8:
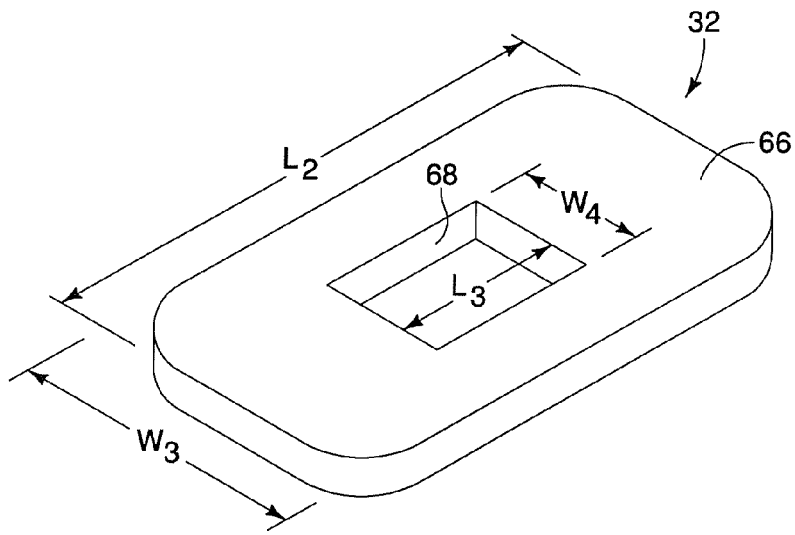
FIG. 8 is another perspective view of the alignment member showing a headliner facing surface of the base portion of the alignment member and the alignment hole of the alignment member in accordance with the first embodiment.
Figure 9:
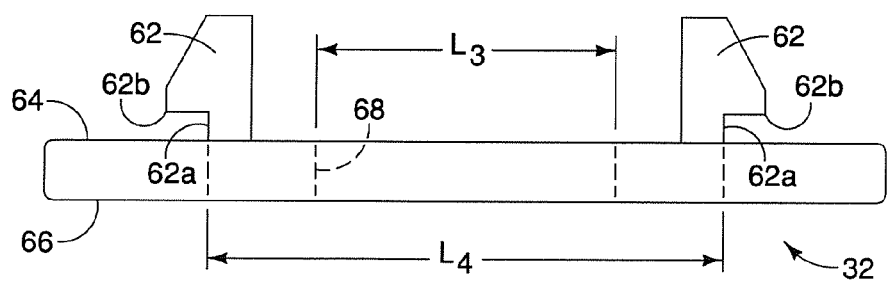
FIG. 9 is a side elevation of the alignment member in accordance with the first embodiment.
Figure 10:
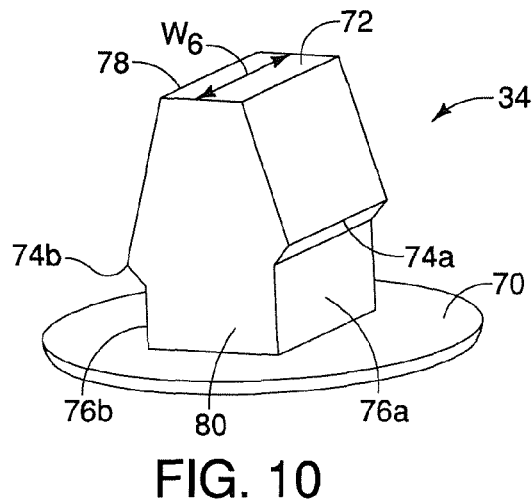
FIG. 10 is a perspective view of one of the fasteners showing a base portion and an attachment projection in accordance with the first embodiment.

As shown in FIGS. 7, 8 and 9, the alignment member 32 basically includes a flat base portion 60 and a pair of snap fitting projections 62. The flat base portion 60 has a roof bow facing surface 64 and a headliner facing surface 66. The flat base portion 60 has an overall length $L_2$ and an overall width $W_3$, as shown in FIGS. 6 and 8. As shown in FIG. 6, the length $L_2$ of the alignment member 32 is greater than the overall length $L_1$ of the slots 42 and the overall width $W_3$ of the alignment member 32 is greater than the overall width $W_1$ of the first slot 42.

With reference again to FIGS. 7, 8 and 9, the flat base portion 60 further defines an alignment hole 68 that extends from the roof bow facing surface 64 to the headliner facing surface 66. The alignment hole 68 is located between the snap-fitting projections 62. The alignment hole 68 is depicted as having an overall rectangular shape, with a length $L_3$ and a width $W_4$. However, the alignment hole 68 can alternatively have an overall square shape.

The snap fitting projections 62 extend from the roof bow facing surface 64 away from the flat base portion 60. Each of the snap fitting projection 62 includes a shoulder surface 62a and a retaining projection 62b that extends perpendicularly away from the shoulder surface 62a and parallel to the roof bow facing surface 64. As shown in FIG. 9, the distance between the two of the shoulder surfaces 62a of the two snap-fitting protrusions 62 is a length $L_4$. In the depicted embodiment, the length $L_4$ between the two shoulder surfaces 62a is indicted as being approximately equal to the length $L_1$ of the slots 42. However, the length $L_4$ between the two shoulder surfaces 62a can be greater than the length $L_1$ of the slots 42 such that the snap fitting projections 62 engage surfaces of the slot 42 and are biased into spring-loaded contact with those surfaces with the alignment member 32 installed in one of the slots 42. As shown in FIG. 7, the snap fitting projections further have a transverse dimension, width $W_5$. The width $W_5$ is less than or equal to the width $W_1$ of the slot 42. Further, the width $W_5$ is less than or equal to the width $W_4$ of the alignment hole 68.

Figure 17:
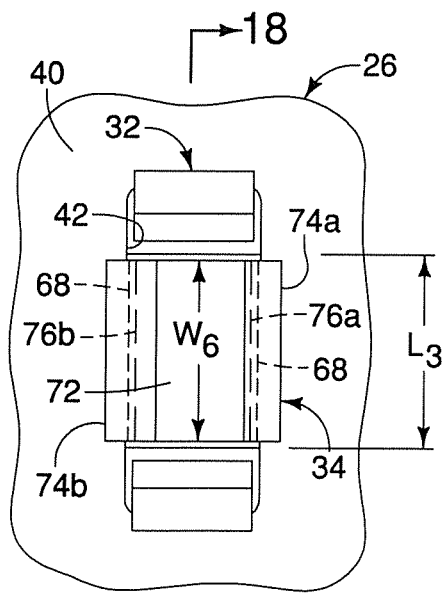
FIG. 17 is a plan view of the portion of one of the roof bows shown in FIG. 16 with the alignment member and one of the fasteners installed in the slot in accordance with the first embodiment.
Figure 18:
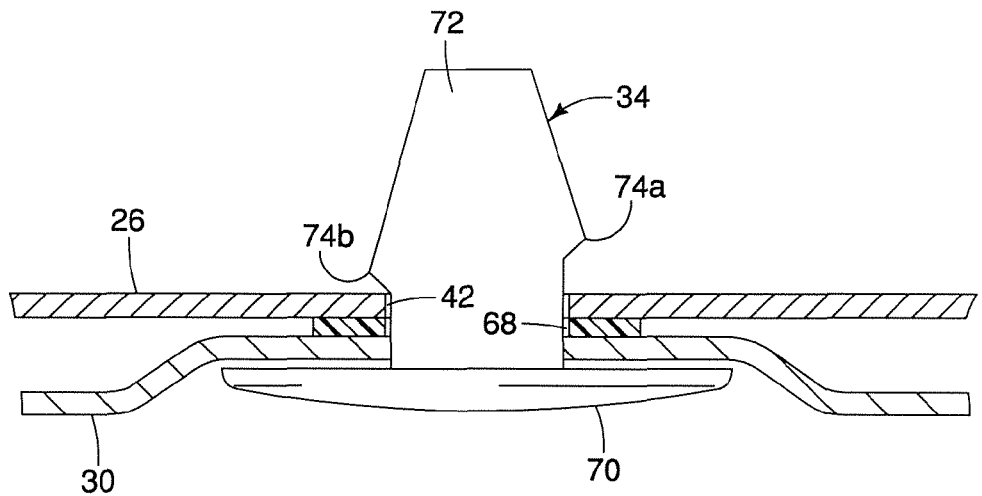
FIG. 18 is a cross-sectional view of the portion the roof bow taken along the line 18-18 in FIG. 17, showing details of the alignment member and the fastener in accordance with the first embodiment.

The alignment member 32 is dimensioned to install in one of the slots 42 such that the snap fitting projections 62 extend into the slot 42. Once installed to one of the slots 42, the alignment member 32 is non-movably attached to the roof bow 26. With the alignment member 32 installed to the slot 42, the alignment hole 68 coincides with a central portion of the slot 42. More specifically, with the alignment member 32 installed to the slot 42, the alignment hole 68 is aligned with the center of the slot 42, as indicated in FIG. 17.

Figure 11:
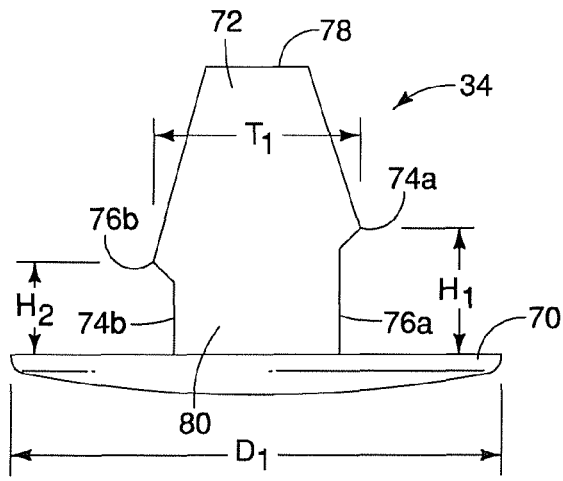
FIG. 11 is a side elevation of the fastener depicted in FIG. 10 in accordance with the first embodiment.

A description of the plurality of fasteners 34 is now provided with reference to FIGS. 10, 11, 12 and 14. The fasteners 34 are preferably made of a plastic or polymer material with a small degree of flexibility, but with sufficient stiffness to retain the headliner 30 to the roof bows 26 in a snap-fitting engagement, as described below. Each of the fasteners 34 includes a circular shaped base portion 70 and an attachment projection 72. The attachment projection 72 extends perpendicularly from the center of the base portion 70. As shown in FIGS. 11 and 14, the base portion 70 has a diameter $D_1$ that is larger than the diameter or width $W_2$ of the apertures 56 of the headliner 30.

As shown in FIG. 11, the attachment projection 72 includes two different snap fitting lips 74a and 74b and corresponding shoulders 76a and 76b. The attachment projection 72 further includes a distal end 78 and a base portion 80 defined between the shoulders 76a and 76b. The snap fitting lip 74a is separated from the base portion 70 by a height $H_1$. The snap fitting lip 74b is separated from the base portion 70 by a height $H_2$. The height $H_1$ is greater than the height $H_2$. The fasteners 34 are conventional fasteners. The differing snap fitting lips 74a and 74b are advantageous in that headliners of varying thicknesses can be installed using a single fastener. Further, for locations where only the fastener 34 is installed (without the alignment member 32) the snap fitting lip 74b will likely snap fit to the roof bow 26. In the location that includes the alignment member 32, the alignment member 32 increases the overall thickness of the headliner assembly 12. Therefore, in the location of the alignment member 32, it is likely that the snap fitting lip 74a will snap fit to the roof bow 26.

Figure 12:
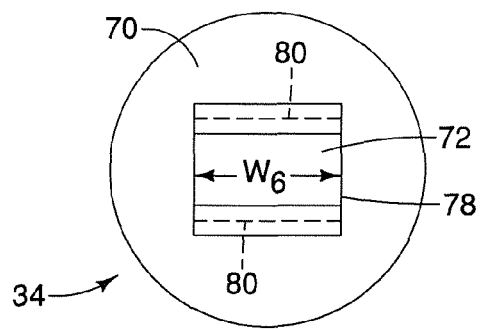
FIG. 12 is a top view of the fastener depicted in FIGS. 10 and 11 in accordance with the first embodiment.

As shown in FIG. 12, the distal end 78 of the attachment projection 72 of the fastener 34 has a rectangular shape when viewed from the distal end 78. Further, as indicated in FIG. 17, the base portion 80 also has a rectangular shape when viewed in cross-section (the base portion 80 is shown in phantom corresponding to a cross-sectional view). The distal end 78 and the base portion 80 have a common dimension $W_6$. However, the base portion 80 has a larger transverse dimension that the distal end 78. Specifically, as indicated in FIG. 14, the rectangular shape of the alignment hole 68 corresponds to the rectangular shape of the base portion 80 of the attachment projection 72 of the fastener 34. Specifically, when the attachment projection 72 is installed through the alignment hole 68 of the alignment member 32, the rectangular shape of the base portion 80 of the fastener 34 prevents rotational movement of the fastener 34 relative to the alignment hole 68 of the alignment member 32. It should be noted that once installed to the slot 42 of the roof bow 26, the fastener 34 snap fits to the roof bow 26, not to the alignment member 32.

As indicated in FIG. 11, the distance between distal ends of the snap fitting lips 74a and 74b is a thickness $T_1$. The thickness $T_1$ is greater than the width $W_1$ of the slot 42 and is also preferably greater than the width $W_4$ of the alignment hole 68 of the alignment member 32.

As indicated in FIGS. 13 and 14, the headliner 30 is installed to the roof bows 26 in the following manner. First, the alignment member 32 is installed to a predetermined one of the roof bows 26 such that the alignment hole 68 of the alignment member 32 coincides with one of the slots 42. Once installed, the alignment member 32 has a snap-fit engagement with the surfaces that define the slot 42. In the depicted embodiment, the slot 42 that includes the alignment member 32 is the left most, upper most slot 42 depicted in FIG. 4. However, it should be understood that other arrangements are possible. In the depicted embodiment, only one slot 42 receives the alignment member 32. None of the remaining slots 42 receive one of the alignment members 32.

Once the alignment member 32 is installed, the headliner 30 is brought up against the roof bows 26 and one of the fasteners 34 is installed through the aperture 56 that corresponds to the slot 42 that includes the alignment member 32. The fastener 34 is then inserted through the alignment hole 68 in the alignment member 32. As it passes through the alignment hole 68 of the alignment member, the snap fitting lips 74a and 74b deflect, since the thickness $T_1$ is greater than the width $W_4$. Further, as it passes through the slot 42, the snap fitting lips 74a and 74b again deflect, since the thickness $T_1$ is greater than the width $W_1$.

As shown in FIGS. 14, 16, 17 and 18, at least one, and possibly both of the snap fitting lips 74a and 74b of the attachment projection 72 contact an upper surface of the roof bow 26 adjacent to the slot 42, with the attachment projection 72 extending through the alignment hole 68 of the alignment member 32 and extending through the slot 42 of the roof bow 26.

Since the alignment member 32 positions the first of the fasteners 34 relative to the slot 42 having the alignment member 32 at the center of the slot 42, the headliner 30 is positioned relative to the roof bows 26 such that the first and second prescribed patterns align with one another. In other words, the first of the fasteners 34 installed to retain the headliner 30 to the roof bows 26, positions the apertures 56 in alignment with the slots 42 and restricts shifting of the headliner 30 in a longitudinal direction (in this example) of the headliner 30 relative to the roof bow 26 during assembly.

Figure 19:
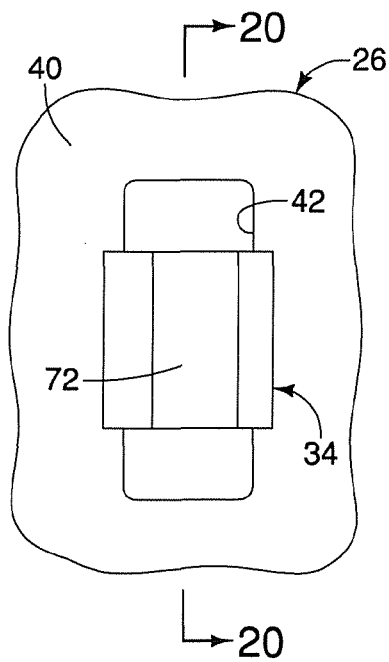
FIG. 19 is a plan view of a portion of one of the roof bows with one of the fasteners installed in the slot in the absence of the alignment member in accordance with the first embodiment.
Figure 20:
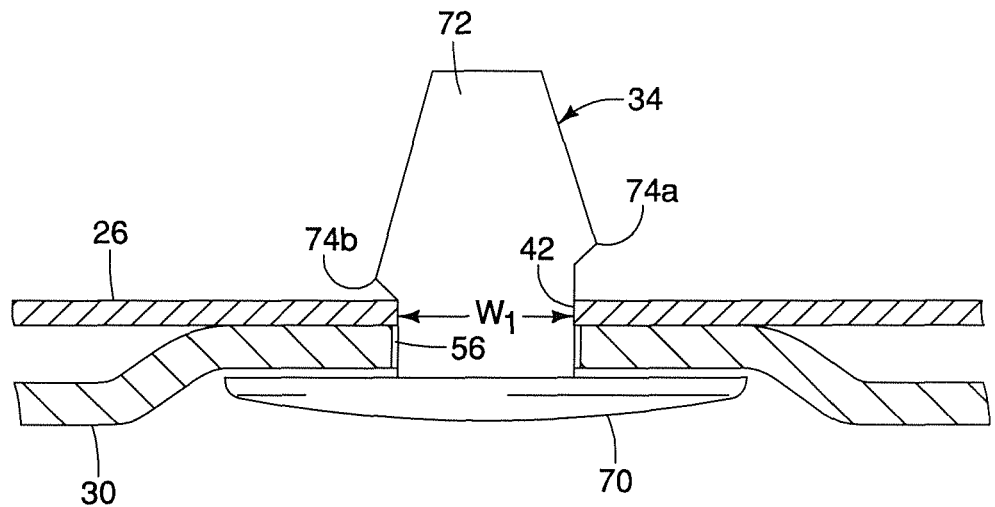
FIG. 20 is a cross-sectional view of the portion the roof bow taken along the line 20-20 in FIG. 19, showing details of the alignment member and the fastener in accordance with the first embodiment.
Figure 21:
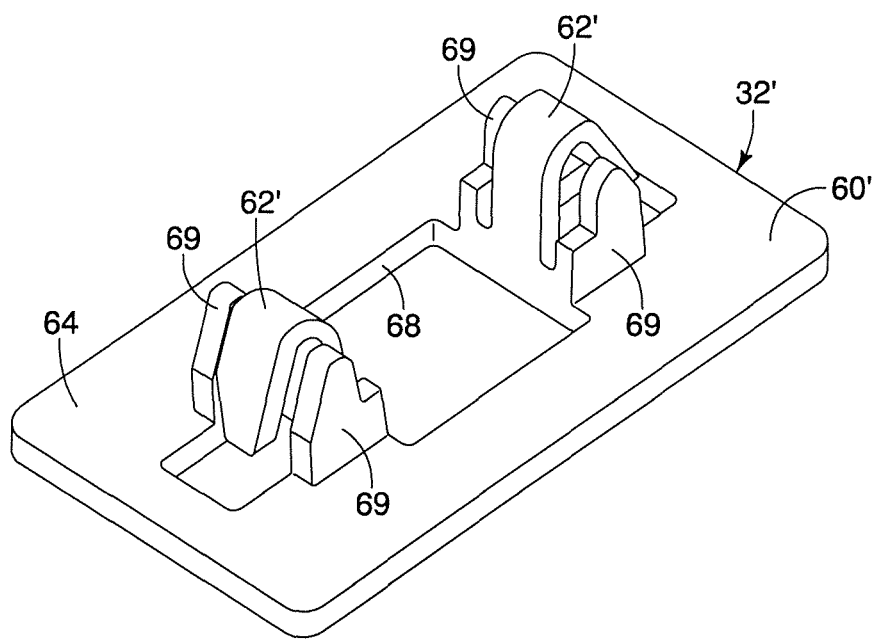
FIG. 21 is a perspective view of an alignment member in accordance with a second embodiment.
Figure 22:
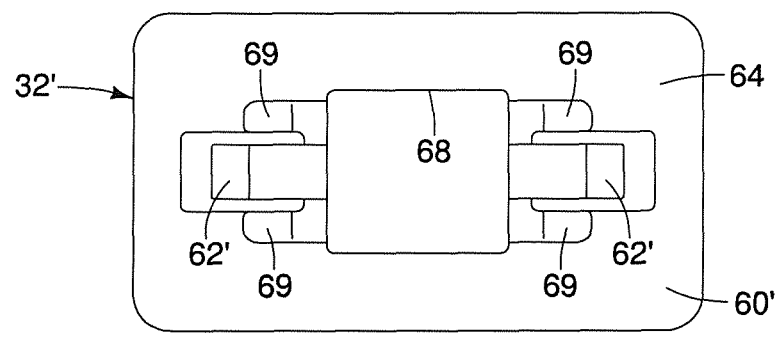
FIG. 22 is a plan view of the alignment member in accordance with the second embodiment.
Figure 23:
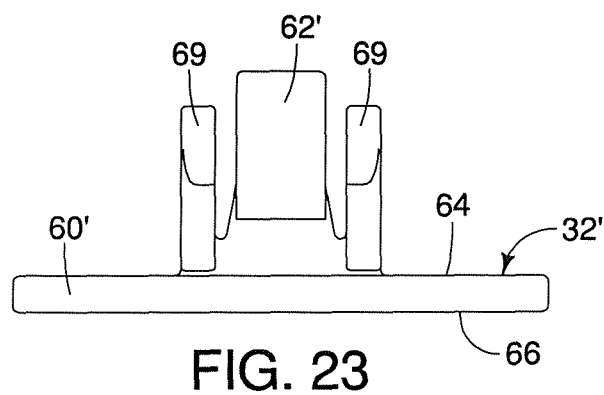
FIG. 23 is an end elevational view of the alignment member in accordance with the second embodiment.
Figure 24:
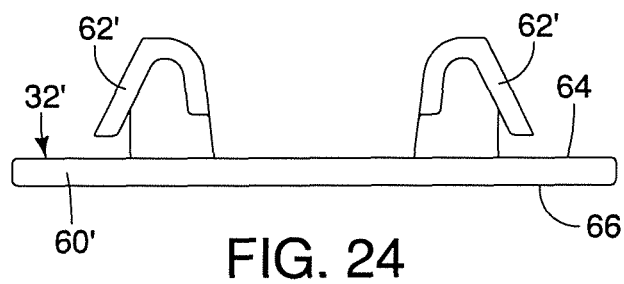
FIG. 24 is a side elevational view of the alignment member in accordance with the second embodiment.

Consequently, the remaining fasteners 34 are more easily installed. Specifically as shown in FIGS. 19 and 20, each of the remaining fasteners 34 are pushed through respective ones of the apertures 56, then through the corresponding slot 42 such that one or both of the snap fitting lips 74a and 74b contacts the upper surface of the roof bow 26 proximate the slots 42 thereby snap fitting the fasteners 34 to the roof bows 26. Thus the headliner 30 is more easily and simply installed. However, it should be understood, that the remaining fasteners 34 extend directly to respective ones of the plurality of slots 42 in the absence of alignment member 32.

Second Embodiment

Referring now to FIG. 21-26, an alignment member 32' in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a single prime (').

The alignment member 32' performs the same alignment functions of the alignment member 32 of the first embodiment and is installed the same way as the alignment member 32 of the first embodiment. Further, in the second embodiment, the roof bows 26, the headliner 30 and the fasteners 34 remain unchanged.

As shown in FIGS. 21-24, the alignment member 32' includes a base portion 60' and a pair of snap fitting projections 62'. The flat base portion 60' has the roof bow facing surface 64 and the headliner facing surface 66. Further, the alignment hole 68 extends from the roof bow facing surface 64 to the headliner facing surface 66, as in the first embodiment.

The snap fitting projections 62' are narrower than the snap fitting projections 62 of the first embodiment. Therefore, to prevent lateral movement of the alignment member 32' relative to the slot 42, projecting tabs 69 are provided on opposing sides of each of the snap fitting projections 62'.

Figure 25:
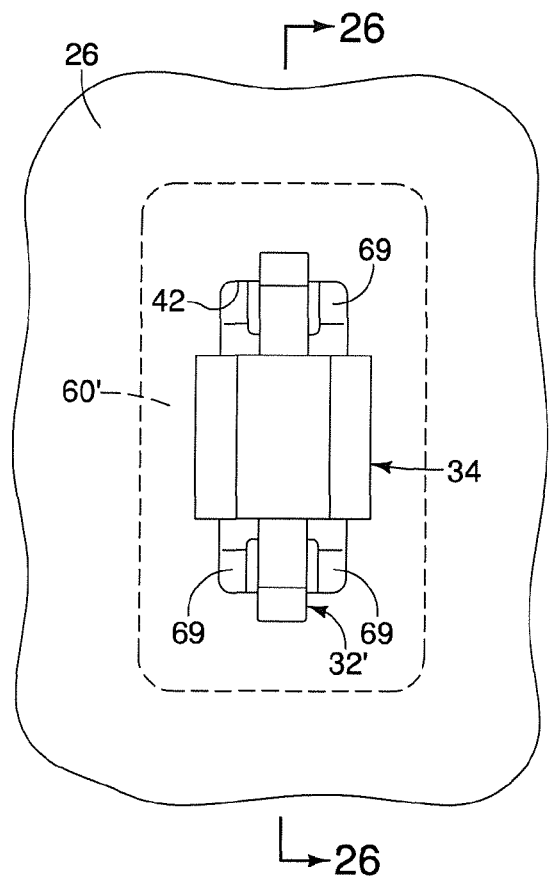
FIG. 25 is a plan view of a portion of one of the roof bows showing the alignment member and one of the fasteners installed in the slot in accordance with the second embodiment.
Figure 26:
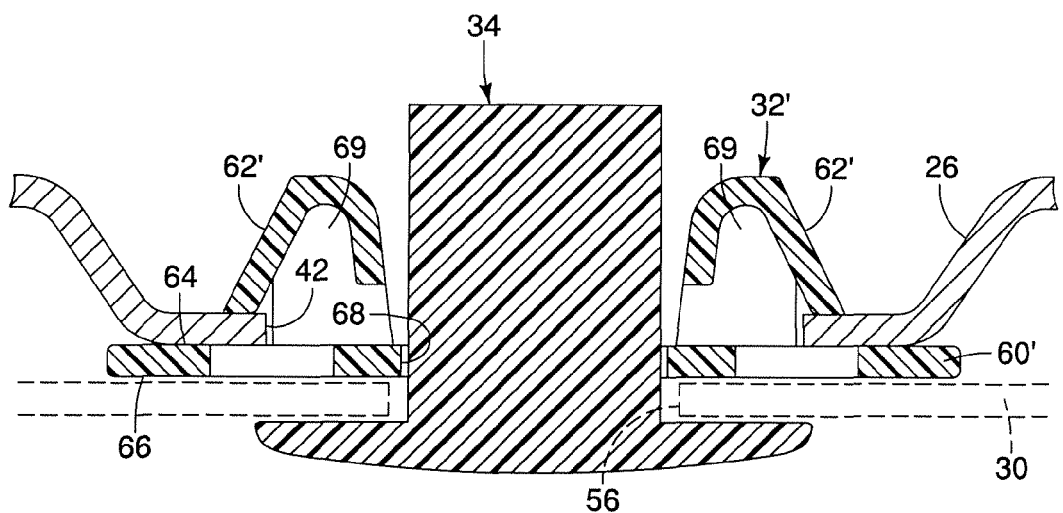
FIG. 26 is a cross-sectional view of the portion the roof bow taken along the line 26-26 in FIG. 25, showing details of the alignment member and the fastener in accordance with the second embodiment.

As shown in FIGS. 25 and 26, the alignment member 32' snap fits into the slot 42 and the fastener 34 extend through the alignment hole 68 in a manner consistent with the first embodiment.

The various features and components of the vehicle 10 other than the headliner assembly 12 are conventional components that are well known in the art. Since these features and components are well known in the art, these structures will not be discussed or illustrated in detail herein. Rather, it will be apparent to those skilled in the art from this disclosure that the components can be any type of structure and/or programming that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the headliner assembly. Accordingly, these terms, as utilized to describe the present invention should be interpreted relative to a vehicle equipped with the headliner assembly.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle headliner assembly comprising
a roof bow including a first slot;
a headliner including a first aperture aligned with the first slot;
an alignment member non-movably installed to the roof bow at the first slot, the alignment member defining an alignment hole that coincides with the first slot; and
a fastener including an attachment projection that extends through the first aperture, through the alignment hole of the alignment member and through the first slot, the attachment projection having a retaining surface contacting a surface of the roof bow adjacent to the first slot and facing away from the headliner such that the fastener retains the headliner to the roof bow.

2. The vehicle headliner assembly according to claim 1, wherein
the first slot includes an overall length and an overall width such that the overall length is at least twice the overall width, and
the first aperture defines a width that is equal to or smaller than the overall width of the first slot.

3. The vehicle headliner assembly according to claim 1, wherein the alignment member includes a pair of snap fitting projections that extend into the first slot and contact the surface of the roof bow.

4. The vehicle headliner assembly according to claim 3, wherein the snap fitting projections include respective shoulder surfaces spaced apart from one another by a distance that is greater than or equal to an overall length of the first slot and having a transverse dimension that is less than or equal to the width of the first slot.

5. The vehicle headliner assembly according to claim 4, wherein the alignment hole is located between the snap fitting projections.

6. The vehicle headliner assembly according to claim 1, wherein
the alignment member includes a flat base portion with a roof bow facing surface defining a length and a width that are greater than an overall length and an overall width, respectively, of the first slot, and
the alignment member includes a pair of snap fitting projections that extend from the roof bow facing surface into the first slot such that the pair of snap fitting projections contacts the surface of the roof bow at opposing ends of the first slot.

7. The vehicle headliner assembly according to claim 1, wherein
the attachment projection of the fastener has a base with a rectangular cross-section, and
the alignment hole has a rectangular shape corresponding to the rectangular cross-section of the base of the attachment projection.

8. The vehicle headliner assembly according to claim 7, wherein
the attachment projection includes a distal end that defines an end surface having a surface area that is less than a cross-sectional area of the base of the attachment projection, with the retaining surface of the attachment projection being situated between the base and the distal end of the attachment projection.

9. The vehicle headliner assembly according to claim 1, further comprising
a plurality of roof bows, each of the roof bows including a plurality of slots, the plurality of slots being positioned with respect to one another with a prescribed spacing between adjacent pairs of the plurality of slots to define a first prescribed pattern, with the first slot cooperating with the plurality of slots to at least partially define the first prescribed pattern, wherein
the headliner defines a plurality of apertures being positioned with respect to one another with a prescribed spacing between adjacent pairs of the plurality of apertures to define a second prescribed pattern, with the first aperture cooperating with the plurality of apertures to at least partially define the second prescribed pattern, and
the second prescribed pattern aligns with the first prescribed pattern with the alignment member and the fastener installed to the roof bow.

10. The vehicle headliner assembly according to claim 9, further comprising
a plurality of fasteners, each of the plurality of fasteners extending through a corresponding one of the plurality of apertures and further extending directly through a corresponding one of the plurality of slots, with the alignment member only being situated at the first slot.

11. A vehicle headliner assembly comprising
a roof bow defining a plurality of slots positioned with respect to one another with prescribed spacing between adjacent pairs of the plurality of slots to define a first prescribed pattern;
a headliner with a mounting surface defining a plurality of apertures positioned with respect to one another with prescribed spacing between adjacent pairs of the plurality of apertures to define a second prescribed pattern;
an alignment member non-movably installed to the roof bow at a first slot among the plurality of slots, the alignment member defining an alignment hole that coincides with the first slot; and
a fastener successively extending through a first aperture among the plurality of apertures, through the alignment hole and through the first slot such that the second prescribed pattern is aligned with the first prescribed pattern.

12. The vehicle headliner assembly according to claim 11, wherein
each of the plurality of slots includes an overall length and an overall width, the overall length being at least twice the overall width, and
each of the plurality of apertures defines a width that is equal to or smaller than the overall width of each of the plurality of slots.

13. The vehicle headliner assembly according to claim 11, wherein
the first slot includes an overall length that is at least twice the overall width of the first slot, and
the alignment member includes a pair of snap fitting projections that extend into the first slot, the pair of snap fitting projections including respective shoulder surfaces spaced apart from one another by a distance greater than or equal to the overall length of the first slot and having a transverse dimension that is less than or equal to the width of the first slot.

14. The vehicle headliner assembly according to claim 13, wherein
the alignment hole is located between the pair of snap fitting projections.

15. The vehicle headliner assembly according to claim 11, wherein
the alignment member includes a flat base portion with a roof bow facing surface defining a length and a width that are greater than an overall length and an overall width, respectively, of the first slot, and
the alignment member includes a pair of snap fitting projections that extend from the roof bow facing surface into the first slot, the pair of snap fitting projections including respective shoulder surfaces spaced apart from one another by a distance greater than or equal to the overall length of the first slot and having a transverse dimension that is less than or equal to the overall width of the first slot.

16. The vehicle headliner assembly according to claim 11, wherein
the fastener includes an attachment projection that contacts a surface of the roof bow adjacent to the first slot with the attachment projection extending through the first aperture in the headliner, the alignment hole of the alignment member and the first slot of the roof bow.

17. The vehicle headliner assembly according to claim 16, wherein
a base of the attachment projection of the fastener has a rectangular cross-section, and
the alignment hole has a rectangular shape corresponding to the rectangular cross-section of the base of the attachment projection.

18. The vehicle headliner assembly according to claim 17, wherein a distal end of the attachment projection defines an end surface having a surface area that is less than a cross-sectional area of the base of the attachment projection, and the attachment projection includes a retaining surface situated between the base and the distal end of the attachment projection such that the retaining surface contacts the surface of the roof bow adjacent to the first slot.

the alignment hole has a rectangular shape corresponding to the rectangular shape of the attachment projection.

19. The vehicle headliner assembly according to claim 18, wherein the fastener includes a circular shaped base portion having a diameter larger than a diameter of the apertures of the headliner, with the attachment projection extending from a center of the circular shaped base portion.

20. The vehicle headliner assembly according to claim 11, further comprising a plurality of fasteners, each of the plurality of fasteners extending through a corresponding one of the plurality of apertures, other than the first aperture, and further extending directly through a corresponding one of the plurality of slots, other than the first slot, with the alignment member only being situated at the first slot.

\* \* \* \* \*